(12) United States Patent
Sogawa et al.

(10) Patent No.: US 11,913,513 B2
(45) Date of Patent: Feb. 27, 2024

(54) VIBRATION DAMPING MATERIAL AND METHOD OF PRODUCING VIBRATION DAMPING MATERIAL

(71) Applicant: HONDA MOTOR CO., LTD., Tokyo (JP)

(72) Inventors: Naoki Sogawa, Tokyo (JP); Yuki Kawaguchi, Tokyo (JP); Ichiro Fujimoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 421 days.

(21) Appl. No.: 17/378,752

(22) Filed: Jul. 18, 2021

(65) Prior Publication Data

US 2022/0025957 A1    Jan. 27, 2022

(30) Foreign Application Priority Data

Jul. 22, 2020 (JP) .................................. 2020-125720
Mar. 30, 2021 (JP) .................................. 2021-058886

(51) Int. Cl.
| | |
|---|---|
| *F16F 15/08* | (2006.01) |
| *C08G 77/32* | (2006.01) |
| *C08G 77/16* | (2006.01) |
| *C08G 77/20* | (2006.01) |
| *B60K 1/00* | (2006.01) |

(52) U.S. Cl.
CPC .............. *F16F 15/08* (2013.01); *C08G 77/16* (2013.01); *C08G 77/20* (2013.01); *C08G 77/32* (2013.01); *B60K 2001/001* (2013.01); *C08G 2220/00* (2013.01); *C08G 2350/00* (2013.01); *F16F 2224/025* (2013.01)

(58) Field of Classification Search
CPC ....................................................... C08G 77/32
See application file for complete search history.

(56) References Cited

FOREIGN PATENT DOCUMENTS

| | | | | |
|---|---|---|---|---|
| CN | 109280404 A | * | 1/2019 | |
| CN | 109354761 A | * | 2/2019 | ............. C08J 9/103 |
| JP | 2001012537 A | | 1/2001 | |
| KR | 102100807 B1 | * | 4/2020 | |
| WO | WO-2007139973 A1 | * | 12/2007 | ............. C08L 21/00 |

* cited by examiner

*Primary Examiner* — Melody M Burch
(74) *Attorney, Agent, or Firm* — CKC & Partners Co., LLC

(57) ABSTRACT

An aspect of the present invention is directed to a vibration damping material for use in a mount part for supporting a motor, the vibration damping material including: a gel of a dehydration condensation reaction product of silicone oil and boric acid, wherein the boric acid is in an amount of 25 to 75 moles based on 100 moles of the total amount of the silicone oil and the boric acid.

7 Claims, 11 Drawing Sheets

VIBRATION DAMPING MATERIAL AND METHOD OF PRODUCING VIBRATION DAMPING MATERIAL This application is based on and claims the benefit of priority from Japanese Patent Application Nos. 2020-125720 and 2021-058886, respectively filed on 22 Jul. 2020 and 30 Mar. 2021, the contents of which are incorporated herein by reference.

BACKGROUND OF THE INVENTION

Field of the Invention

The present invention relates to a vibration damping material and a method of producing a vibration damping material.

Related Art

In the conventional art, a fluid-filled vibration damping device that operates with a Newtonian fluid is proposed for mounting an automotive engine or body (see, for example, Patent Document 1). Such a vibration damping device is said to be able to exhibit different damping characteristics with no need for a special switching or controlling device and thus able to selectively provide effective damping of each of different input vibrations.

Patent Document 1: Japanese Unexamined Patent Application, Publication No. 2001-12537

SUMMARY OF THE INVENTION

However, vibration damping materials for mounting an automotive motor should address not only large stress associated with a change in torque at the start of rotation of the rotary shaft of the motor but also small vibrations during running. For this purpose, vibration damping materials are required to have a higher rate of change of stress.

It is an object of the present invention, which has been made in view of the above, to provide a vibration damping material having a higher rate of change of stress than that in the conventional art and being capable of dealing with not only large stress associated with a change in torque at the start of rotation of the rotary shaft of a motor but also small vibrations during running.

(1) To achieve the object, the present invention provides a vibration damping material for use in a mount part for supporting a motor, the vibration damping material including: a gel of a dehydration condensation reaction product of silicone oil and boric acid, wherein the boric acid is in an amount of 25 to 75 moles based on 100 moles of the total amount of the silicone oil and the boric acid.

(2) In the vibration damping material according to aspect (1), the silicone oil may have at least one side chain selected from the group consisting of a methyl group, a phenyl group, and a vinyl group, and the silicon oil may have at least one end group selected from the group consisting of a hydroxy group, a carboxyl group, a sulfo group, a group derived from an alcohol by removal of a non-hydroxylic hydrogen atom, and a group derived from a diol by removal of a non-hydroxylic hydrogen atom.

(3) In the vibration damping material according to aspect (1), the silicone oil may have a methyl group as a side chain and have a hydroxy group at each end.

(4) The vibration damping material according to aspect (1) may further include silicone rubber, wherein the gel may be in an amount of 1 to 30% by mass based on 100% by mass of the total amount of the silicone rubber and the gel.

(5) In the vibration damping material according to aspect (4), the silicone rubber may have at least one side chain selected from the group consisting of a methyl group, a phenyl group, a vinyl group, a fluoro group, a trifluoromethyl group, and a trifluoropropyl group, and the silicone rubber may have at least one end group selected from the group consisting of a methyl group, a hydroxy group, and a vinyl group.

(6) The vibration damping material according to aspect (1) may further include a filler and may have a chemical bond between the filler and the gel.

(7) The present invention also provides a method of producing the vibration damping material according to aspect (6), the method including: providing a filler having a substituent; and performing a dehydration condensation step including subjecting the gel and the substituent of the filler to a dehydration condensation reaction to form a chemical bond between the filler and the gel.

The present invention makes it possible to provide a vibration damping material having a higher rate of change of stress than that in the conventional art and being capable of dealing with not only large stress associated with a change in torque at the start of rotation of the rotary shaft of a motor but also small vibrations during running.

DETAILED DESCRIPTION OF THE INVENTION

First Embodiment

Hereinafter, a first embodiment of the present invention will be described in detail with reference to the drawings. It should be noted that, in FIGS. 1 and 2, Fr represents vehicle front, Rr vehicle rear, FR right front of vehicle (right front in the direction of driver's view), and FL left front of vehicle (left front in the direction of driver's view).

Figure 1:
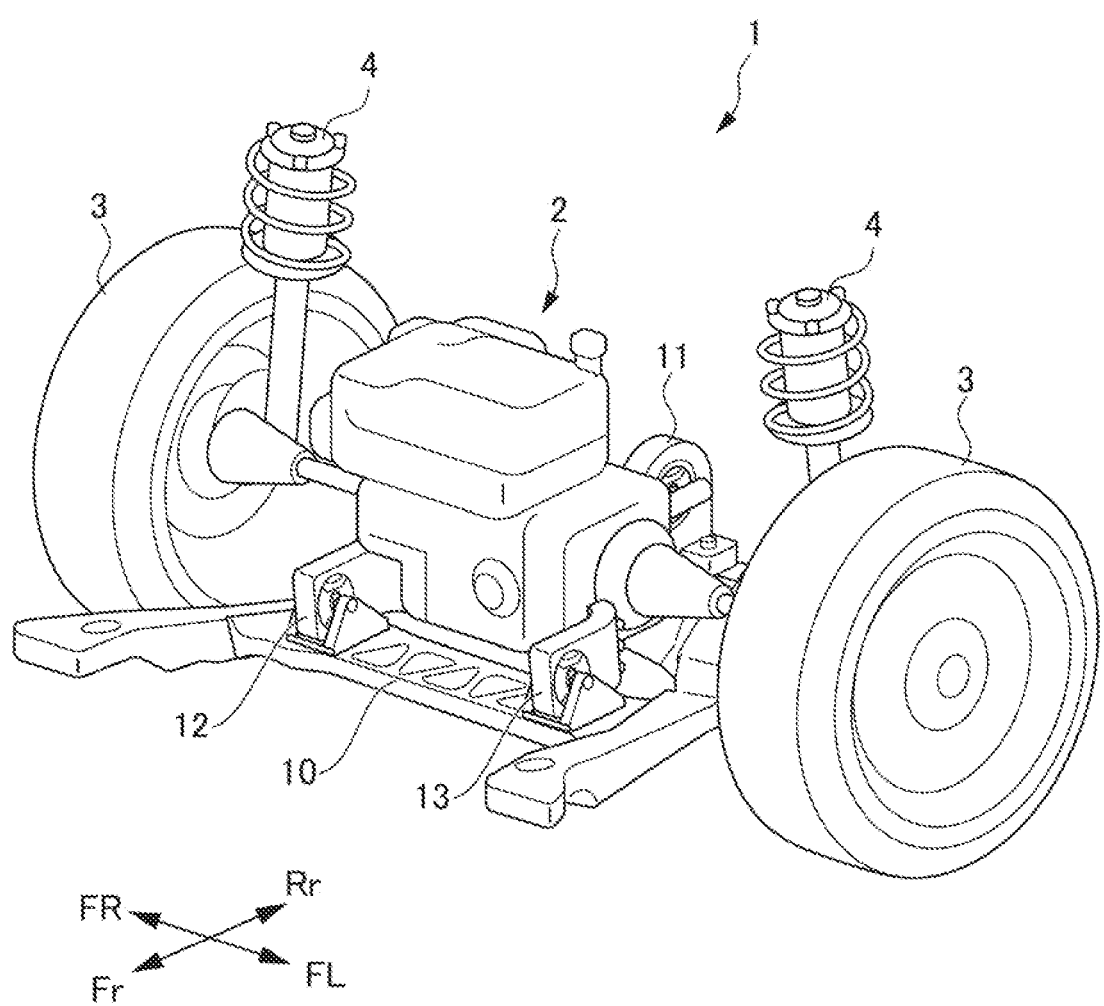
FIG. 1 is a perspective view showing a motor support structure including a mount part including a vibration damping material according to a first embodiment of the present invention.

FIG. 1 is a perspective view showing a motor support structure 1 including mount parts 11, 12, and 13 each including a vibration damping material according to a first embodiment of the present invention. As shown in FIG. 1, the mount parts 11, 12, and 13 each including the vibration damping material according to this embodiment are disposed on a frame 10 of an electric vehicle body, and a motor 2 is supported on the frame 10 with the mount parts 11, 12, and 13 in between the motor 2 and the frame 10.

Figure 2:
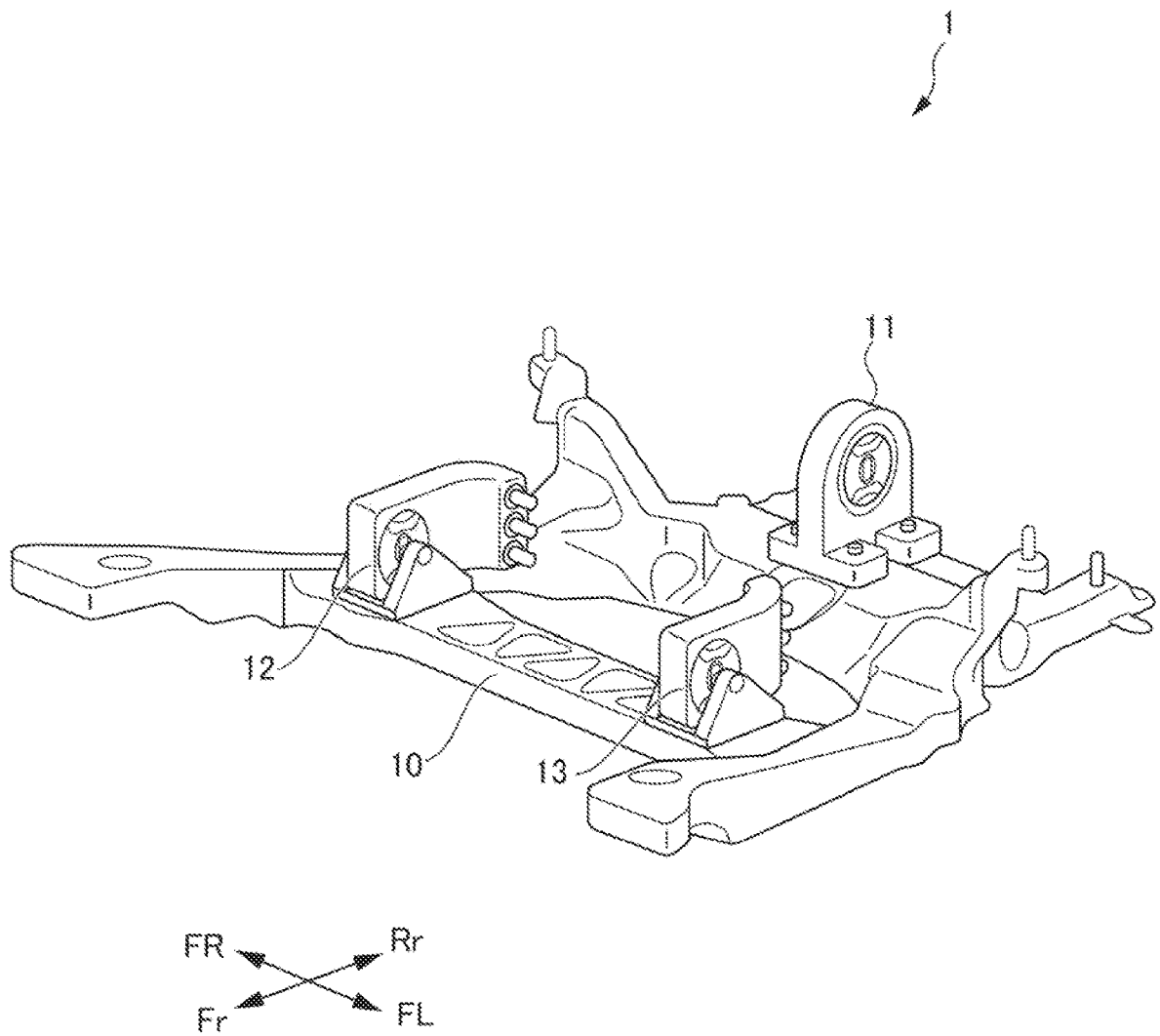
FIG. 2 is a perspective view showing a mount part including a vibration damping material according to the first embodiment of the present invention.

FIG. 2 is a perspective view showing the mount parts 11, 12, and 13 each including the vibration damping material according to the first embodiment of the present invention. As shown in FIG. 2, the mount parts 11, 12, and 13 each including the vibration damping material according to the first embodiment of the present invention include a rear mount part (denoted by 11) disposed on a rear portion of the vehicle, a left front mount part (denoted by 13) disposed on a left front portion of the vehicle, and a right front mount part (denoted by 12) disposed on a right front portion of the vehicle. The motor 2 is supported on the frame 10 with the three mount parts 11, 12, and 13 in between the motor 2 and the frame 10.

Figure 3:
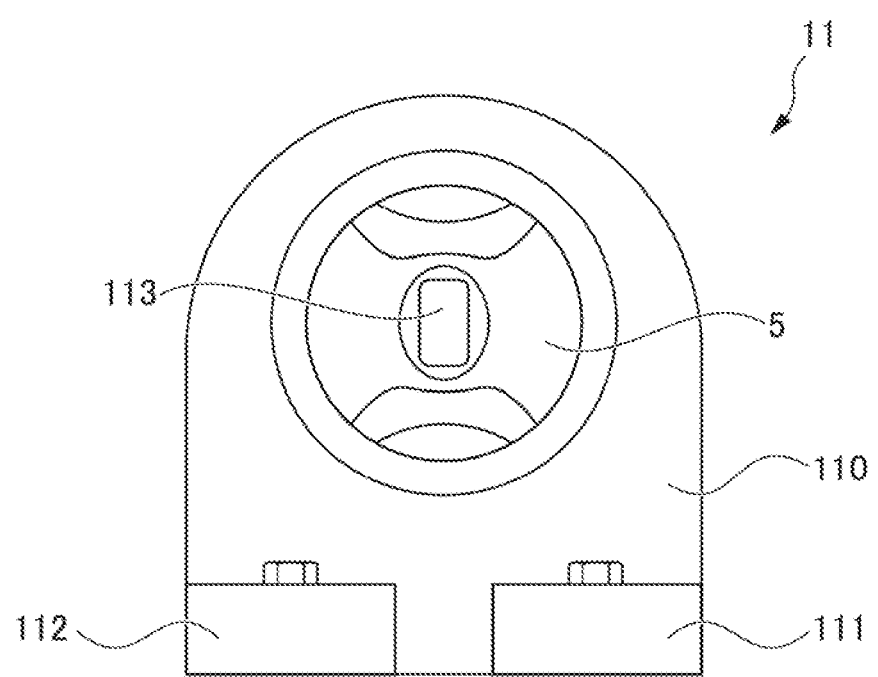
FIG. 3 is a side view of a rear mount part including a vibration damping material according to the first embodiment of the present invention.

FIG. 3 is a side view (side view in the FR direction) of the rear mount part 11 including the vibration damping material according to the first embodiment of the present invention. As shown in FIG. 3, the rear mount part 11 includes a main body 110 and a pair of legs 111 and 112 that are fixed on the frame 10 to support the main body 110. The main body 110 has a support portion 113 for supporting the motor 2. A vibration damping material 5 is provided around the support portion 113 to connect the support portion 113 and the main body 110.

Figure 4:
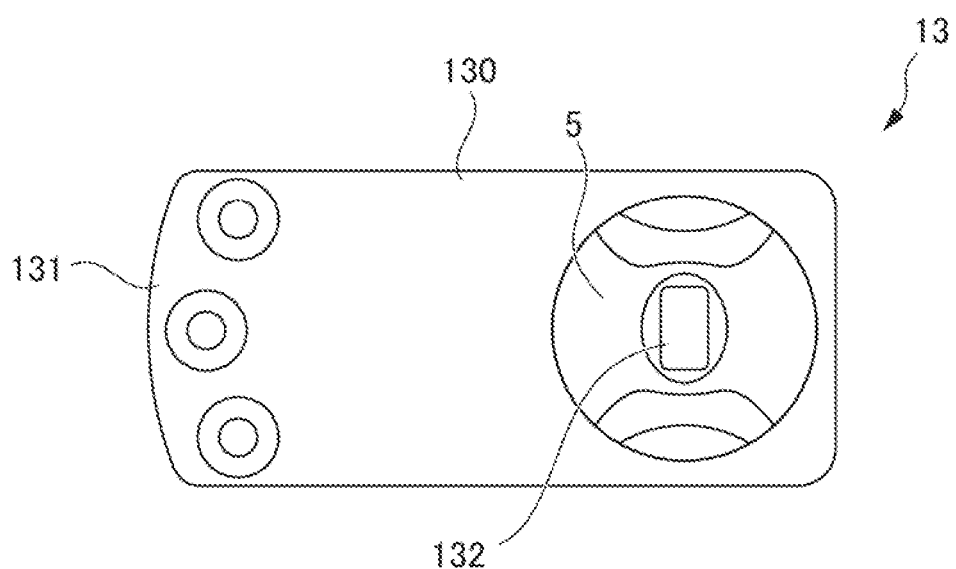
FIG. 4 is a side view of a left front mount part including a vibration damping material according to the first embodiment of the present invention.

FIG. 4 is a side view of the left front mount part 13 including the vibration damping material according to the first embodiment of the present invention. Hereinafter, only the structure of the left front mount part 13 will be described as a representative since the right front mount part 12 and the left front mount part 13 have the same structure. As shown in FIG. 4, the left front mount part 13 includes a main body 130 and a stationary portion 131, which is fixed to the motor 2. The main body 130 has a support portion 132 supported on the frame 10. A vibration damping material 5 is provided around the support portion 132 to connect the support portion 132 and the frame 10.

The vibration damping material 5 in the rear mount part 11 described above and the vibration damping material 5 in each of the left front mount part 13 and the right front mount part 12 are made of the same material. The vibration damping material 5 has the function of absorbing both of: vibrations caused by the driving force of the motor 2, in particular, vibrations caused by a large driving force output from the motor 2 during acceleration as described later; and vibrations caused by irregularities of the road surface and transmitted during the running of the vehicle from wheels 3 to the vehicle body through suspensions 4.

Next, the function required of the vibration damping materials 5 will be described. Mount parts are essentially designed to have the function of supporting a power train (hereinafter abbreviated as PT), such as an engine or a motor, the function of restricting the displacement of PT to improve the ride quality, and the function (NV) of blocking the vibration of PT. Vibration damping materials for use as mount part materials include isoprene rubber (natural rubber) cross-linked through sulfur bonds, synthetic rubber produced by cross-linking a polymer material containing a cross-linking agent, a reinforcing material, an antioxidant, etc., and other elastic springs.

In general, the driving force of an engine changes as a transmission (T/M) switches the gear ratio. Specifically, the driving force of an engine is characterized in that it becomes larger as a lower gear is used for lower vehicle speeds whereas it become smaller as a higher gear is used for higher vehicle speeds. On the other hand, the driving force of a motor is characterized in that it can be larger at lower vehicle speeds. This means that a motor can produce a large driving force even at the initial speed so that it can provide smooth acceleration.

Unfortunately, there is a concern that such a motor-specific driving force (torque), specifically, a large transient driving force from a motor during acceleration or deceleration may cause displacement and change to input (transmit) vibration and shock to the vehicle body through the mount parts 11, 12, and 13. At present, therefore, the motor torque is reduced by motor torque control so that the acceleration performance is compromised.

Figure 5:
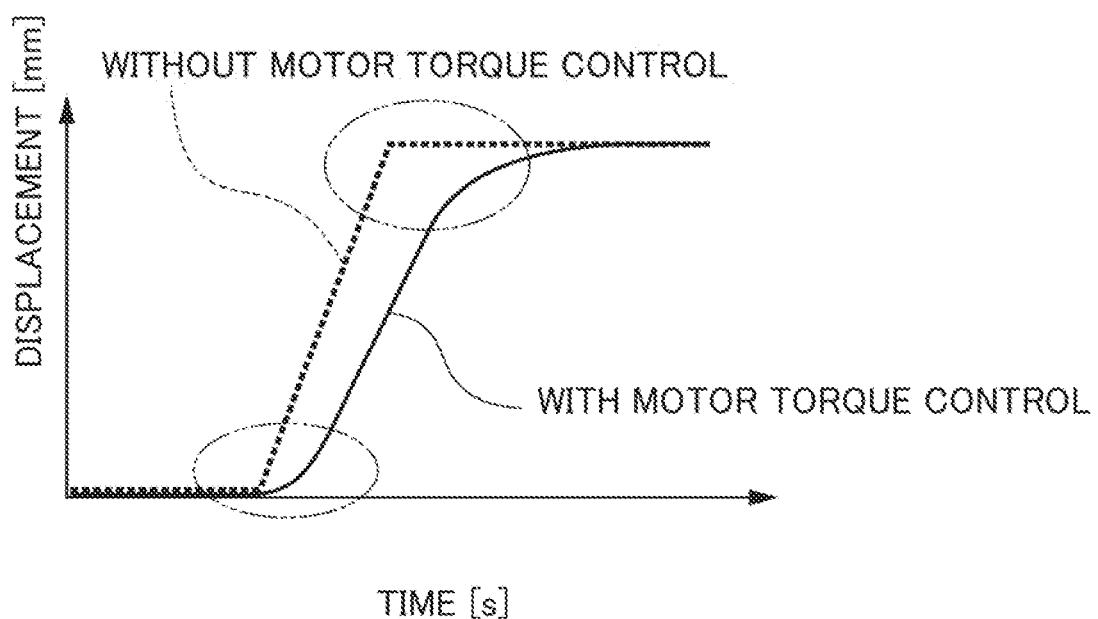
FIG. 5 is a diagram for illustrating motor torque control.

In this regard, FIG. 5 is a diagram for illustrating motor torque control. In FIG. 5, the horizontal axis represents time (s), and the vertical axis represents displacement (mm). The broken line indicates the displacement supposed to be input due to the original torque of a motor, and the solid line indicates the displacement input when motor torque control is performed. FIG. 5 shows that, at present, the motor torque control reduces the driving force during acceleration and deceleration (the areas surrounded by the dashed-two dotted line in FIG. 5) so that the original acceleration performance of a motor is not fully utilized.

In order to fully utilize the original acceleration performance of a motor, therefore, vibration damping materials are required to have the function of absorbing both of: vibrations caused by a large driving force output from the motor 2 during acceleration; and vibrations caused by irregularities of the road surface and transmitted during the running of the vehicle from wheels 3 to the vehicle body through suspensions 4. Unfortunately, vibration damping materials with such a function are not found in the conventional art. To address this problem, the vibration damping material 5 according to this embodiment is a novel vibration damping material having the function of absorbing both of those types of vibrations, which is not found in the conventional art.

Figure 6:
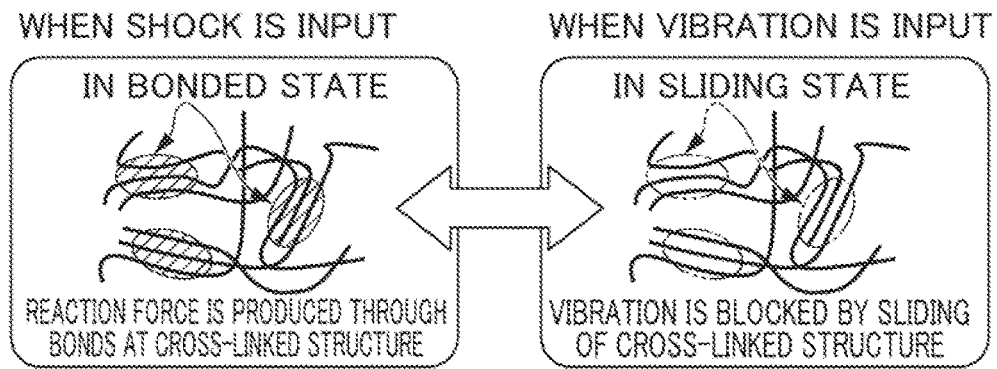
FIG. 6 is a view for illustrating the structure of a vibration damping material according to the first embodiment of the present invention.

Next, the features of the vibration damping material 5 according to the first embodiment will be described. FIG. 6 is a view for illustrating the structure of the vibration damping material 5 according to this embodiment. As shown in FIG. 6, the vibration damping material 5 according to this embodiment has a structure that can produce a reaction force through bonds at cross-linked structures when a large vibration shock is input to the material 5 and that can block vibrations by sliding (softening) cross-linked structures when relatively small vibrations are input to the material 5. That is, the vibration damping material 5 according to this embodiment is a variable response vibration damping material capable of switching the reaction force depending on the speed of input of vibration. Such features make it possible to absorb both of: vibrations caused by a large driving force output from the motor 2 during acceleration; and vibrations caused by irregularities of the road surface and transmitted during the running of the vehicle from wheels 3 to the vehicle body through suspensions 4.

Specifically, the vibration damping material 5 according to this embodiment includes a silicone oil-boric acid gel (hereinafter, also simply referred to as "gel"), which is a dehydration condensation reaction product of silicone oil and boric acid. This gel is a product of gelation of silicone oil and boric acid bonded together by dehydration condensation reaction between silanol groups of the silicone oil and the hydroxyl group of the boric acid. The gel serves as the variable response vibration damping material described above with reference to FIG. 6. More specifically, the terminal substituents of the silicone oil and the boric acid are expected to undergo chemical bonding and/or dissociation depending on the speed of input of vibration, so that the reaction force can be switched depending on the speed of input of vibration. This makes it possible to provide a high rate of change of stress for the vibration damping material 5.

Moreover, in the vibration damping material 5 according to this embodiment, the number of moles of boric acid is 25 to 75 based on 100 moles of the total amount of silicone oil and boric acid. The stress characteristics variable depending on the speed of input of vibration described above are available when the number of moles of boric acid is 25 or more based on 100 moles of the total amount of silicone oil and boric acid. On the other hand, the occurrence of undissolved residue can be prevented when the number of moles of boric acid is 75 or less based on 100 moles of the total amount of silicone oil and boric acid. The number of moles of boric acid is more preferably 37.5 to 50 based on 100 moles of the total amount of silicone oil and boric acid, which allows the change of the content to be more significantly effective in improving the variable stress characteristics.

Figure 7:
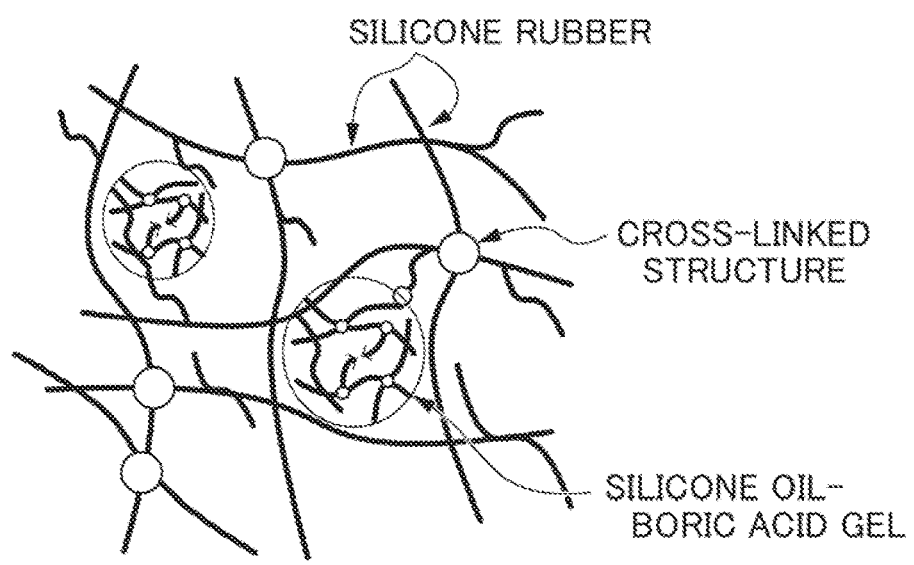
FIG. 7 is a schematic view showing an example of the structure of a vibration damping material according to the first embodiment of the present invention.

FIG. 7 is a schematic view showing an example of the structure of the vibration damping material 5 according to this embodiment. As shown in FIG. 7, the vibration damping material 5 according to this embodiment preferably further includes silicone rubber. Thus, the vibration damping material 5 according to this embodiment preferably has a structure in which the gel described above is bonded to the silicone rubber as a base polymer. The vibration damping material 5 with this feature is expected to have physical properties derived from the silicone rubber and can have an improved rate of change of stress as a variable response vibration damping material.

The vibration damping material 5 according to this embodiment may further include, as a base polymer, natural rubber, nitrile rubber, silicone rubber, fluoro-rubber, urethane rubber, acrylic rubber, isoprene rubber, styrene rubber, butadiene rubber, butyl rubber, ethylene-propylene rubber, ethylene-propylene-diene rubber, ethylene-vinyl acetate rubber, chloroprene rubber, Hypalon, or chlorinated polyethylene rubber.

The amount of the gel is preferably 1 to 30% by mass based on 100% by mass of the total amount of the silicone rubber and the gel. The stress characteristics variable depending on the speed of input of vibration are available when the amount of the gel is 1% by mass or more based on 100% by mass of the total amount of the silicone rubber and the gel. The formability can be ensured when the amount of the gel is 30% by mass or less based on 100% by mass of the total amount of the silicone rubber and the gel. The amount of the gel is more preferably 5 to 20% by mass based on 100% by mass of the total amount of the silicone rubber and the gel, which is effective in improving the stress variability during high-speed input.

Figure 8A:
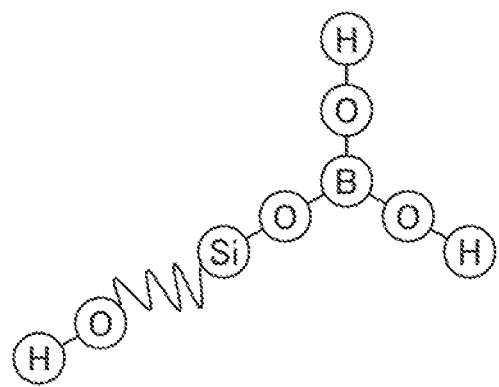
FIG. 8A is a diagram showing a gel structure with one Si—O—B bond.
Figure 8B:
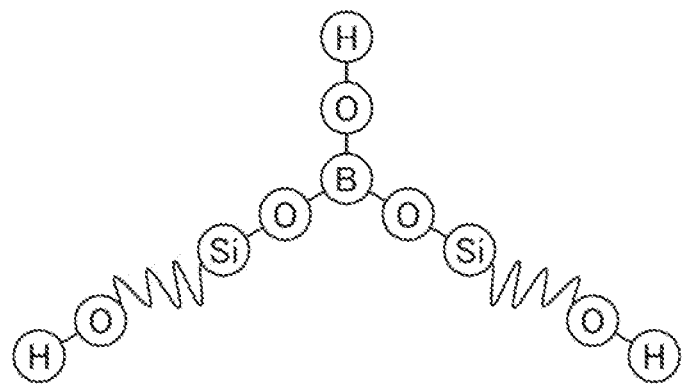
FIG. 8B is a diagram showing a gel structure with two Si—O—B bonds.
Figure 8C:
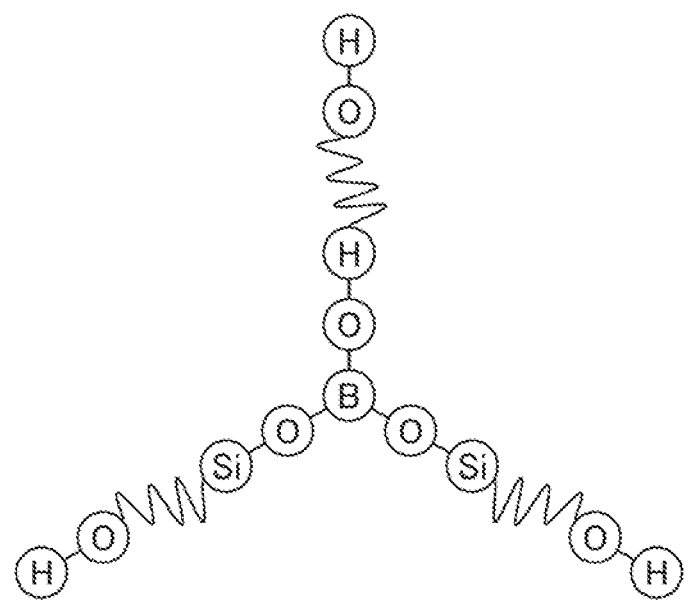
FIG. 8C is a diagram showing a gel structure with three Si—O—B bonds.

FIG. 8A is a diagram showing a gel structure with one Si—O—B bond. FIG. 8B is a diagram showing a gel structure with two Si—O—B bonds. FIG. 8C is a diagram showing a gel structure with three Si—O—B bonds. As shown in FIGS. 8A to 8C, the gel in the vibration damping material 5 according to this embodiment may be a mixture resulting from bonding of one, two, or three molecules of silicone oil to one molecule of boric acid.

The silicone oil and the silicone rubber used to form the vibration damping material 5 according to this embodiment will be described in more detail. First, both of the silicone oil and the silicone rubber used to form the vibration damping material 5 according to this embodiment can be obtained by polymerizing a monomer represented by chemical formula (1) below. Specifically, both of the silicone oil and the silicone rubber used to form the vibration damping material 5 according to this embodiment share a common basic skeleton represented by chemical formula (2) below.

[Chem. 1]

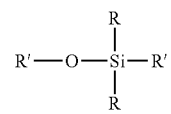

Chemical Formula (1)

[Chem. 2]

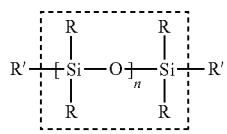

Chemical Formula (2)

In chemical formulas (1) and (2), side chains represented by R may be one or more selected from a methyl group of chemical formula (3) below, a phenyl group of chemical formula (4) below, a vinyl group of chemical formula (5) below, a fluoro group of chemical formula (6) below, a trifluoromethyl group of chemical formula (7) below, and a trifluoropropyl group of chemical formula (8) below.

[Chem. 3]

 Chemical Formula (3)

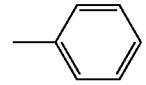 Chemical Formula (4)

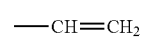 Chemical Formula (5)

 Chemical Formula (6)

 Chemical Formula (7)

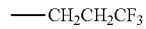 Chemical Formula (8)

In chemical formulas (1) and (2), end groups represented by R' may be one or more selected from a hydroxyl group of chemical formula (9) below, a carboxyl group of chemical formula (10) below, a sulfo group of chemical formula (11) below, a group derived from an alcohol of chemical formula (12) below by removal of a non-hydroxylic hydrogen atom, a group derived from a diol of chemical formula (13) below by removal of a non-hydroxylic hydrogen atom, a methyl group of chemical formula (14) below, and a vinyl group of chemical formula (15) below. It should be noted that, while both end groups represented by R' are most effectively hydroxyl groups (namely terminal silanol groups), the advantageous effect can be produced regardless of whether one or both of the end groups are selected from the above.

[Chem. 4]

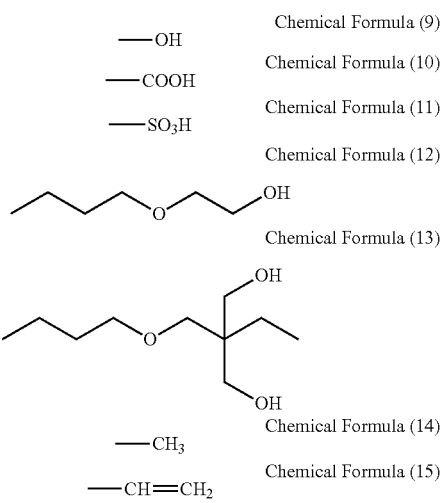

In the silicone oil, the side chains represented by R are preferably at least one selected from the group consisting of a methyl group, a phenyl group, and a vinyl group. In particular, the silicone oil preferably has a methyl group or groups as a side chain or chains represented by R. Preferably, the side chains represented by R are mainly methyl and locally substituted with other derivatives.

Similarly, in the silicone oil, the end groups represented by R' are preferably at least one selected from the group consisting of a hydrozy group, a carboxyl group, a sulfo group, a group derived from an alcohol by removal of a non-hydroxylic hydrogen atom, and a group derived from a diol by removal of a non-hydroxylic hydrogen atom. In particular, both end groups R' of the silicone oil are more preferably hydroxy groups.

The silicone oil with the structure described above preferably has a molecular weight of 1,000 to 100,000 g/mol. The silicone oil with a molecular weight in this range allows the vibration damping material to function as a variable response vibration damping material. The silicone oil more preferably has a molecular weight of 5,000 to 8,000 g/mol.

In the silicone rubber, the side chains represented by R are preferably at least one selected from the group consisting of a methyl group, a phenyl group, a vinyl group, a fluoro group, a trifluoromethyl group, and a trifluoropropyl group. Preferably, the side chains represented by R are mainly methyl and locally substituted with other derivatives.

Similarly, in the silicone rubber, the end groups represented by R' are preferably at least one selected from the group consisting of a methyl group, a hydroxy group, and a vinyl group.

Examples of the silicone rubber include methyl silicone rubber of chemical formula (16) below, fluorosilicone rubber of chemical formula (17) below, trifluoropropyl silicone rubber of chemical formula (18) below, vinyl methyl silicone rubber of chemical formula (19) below, phenyl methyl silicone rubber of chemical formula (20) below, diphenyl methyl silicone rubber of chemical formula (21) below, and vinyl trifluoropropyl silicone rubber of chemical formula (22) below.

[Chem. 5]

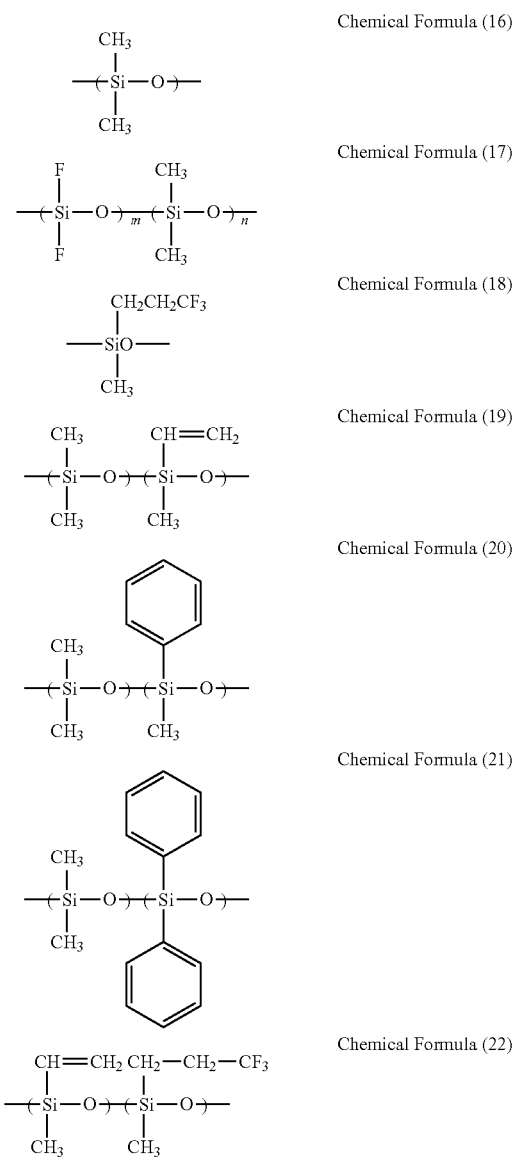

A commercially available product may also be used as the silicone rubber in this embodiment. For example, such a commercially available product may be KE5550-U or KE-1950-60-A/B manufactured by Shin-Etsu Chemical Co., Ltd., or SilGel 612 A/B manufactured by Wacker Chemie AG.

The silicone rubber with the structure described above preferably has a molecular weight of 1,000 to 1,000,000 g/mol. The silicone rubber with a molecular weight in this range allows the vibration damping material to function as a variable response vibration damping material. The silicone rubber more preferably has a molecular weight of 300,000 to 600,000 g/mol.

A method of producing the vibration damping material 5 according to this embodiment with the features described above will be described. First, a gel can be prepared, for example, as shown below. For example, boric acid and acetone are placed in a glass vessel and stirred at room temperature for 30 minutes. Silicone oil is then added such that silicone oil (PDMS (polydimethylsiloxane)) and boric acid are in a stoichiometric ratio of 3:2 to form a mixture. The mixture is then heated and stirred with a hot stirrer at 120° C. for 3 hours. Finally, the mixture is allowed to stand at room temperature until the solvent evaporates, so that the gel is obtained.

Subsequently, a vibration damping material including the gel prepared as described above and silicone rubber can be prepared, for example, as shown below. For example, the gel prepared as described above is added to uncross-linked silicone rubber and kneaded thoroughly. Subsequently, the mixture is cast into a mold and then subjected to heating, pressing, and other processes according to the preparation method recommended in the catalog for each corresponding silicone rubber, so that a vibration damping material is obtained.

More specifically, in the case of silicone rubber that requires mixing of two liquids, the gel is first added to silicone rubber material A and stirred for 1 hour to form a mixture. Subsequently, after the mixture is degassed, silicone rubber material B is added to the mixture. After thorough mixing, the mixture is subjected to cross-linking by heating at 150° C. for at least 2 hours, so that a vibration damping material is obtained.

Alternatively, in the case of millable type (hot vulcanized) silicone rubber, roll mixing (at a rotational speed of 25 rpm and a roll temperature of 40±5° C.) is first performed to carry out mastication (rubber), addition of additives, ¾ turn (reciprocated three times), and passing between rolls (six times). Subsequently, the product is subjected to press forming under conditions at 165° C. for 10 minutes (for forming a sheet) or 15 minutes (for forming a compression set test piece) and then subjected to secondary vulcanization at 200° C. for 4 hours to give a vibration damping material.

It will be understood that the embodiment described above is not intended to limit the present invention and any alterations or modifications of the embodiment will fall within the scope of the present invention as long as they achieve the object of the present invention.

Second Embodiment

Hereinafter, a second embodiment of the present invention will be described in detail with reference to the drawings. A vibration damping material according to the second embodiment of the present invention may also include the same component as that of the vibration damping material 5 according to the first embodiment and may also be used for the same applications as those for the vibration damping material 5 (see FIGS. 1 to 4).

The features of the vibration damping material according to the second embodiment of the present invention will be described. The vibration damping material according to this embodiment includes a filler in addition to the silicone oil-boric acid gel, which is a dehydration condensation reaction product of silicone oil and boric acid, in which the silicone oil-boric acid gel and the filler are chemically bonded together (by dehydration condensation reaction). In this embodiment, the silicone oil-boric acid gel and the filler are chemically bonded to form a complex. Such a complex having a chemical bond between the silicone oil-boric acid gel and the filler (a chemical cross-link structure between the gel and the filler) is also referred to as the "gel-filler complex".

The vibration damping material according to this embodiment has a structure that can produce a reaction force through the chemical bond between the filler and the silicone oil-boric acid gel (hereinafter also simply referred to as the "gel") when a large vibration shock is input to the material and that can block vibrations by sliding (softening) the cross-linked structure between the gel and the filler when relatively small vibrations are input to the material. Moreover, the vibration damping material has a structure in which the gel including the silicone oil and the boric acid is entangled with the filler, which further improves its damping performance. The vibration damping material having the gel-filler cross-link structure according to this embodiment has the surface of the filler modified by the chemical bond with the gel. Therefore, the effect of the entanglement by the gel molecule chain can further reduce the interference between filler particles and impart a slide effect between filler particles, which improves the vibration blocking performance. The sliding structure can also prevent the degradation of the vibration blocking performance, which would otherwise be caused by the interference between filler particles during the input of vibrations or small displacement. During large displacement, the vibration damping material according to this embodiment can soften only at the interface and thus remain stiff by allowing close filler particles to interfere with one another through the gel, in contract to a material including a gel and a filler simply dispersed by kneading or the like. That is, the vibration damping material according to this embodiment is a variable response vibration damping material capable of switching the reaction force depending on the speed of input of vibration.

More specifically, the terminal substituents of the silicone oil and the boric acid are expected to undergo chemical bonding and/or dissociation depending on the speed of input of vibration, and the chemical bond between the gel and the filler provides a gel-filler sliding structure and a gel-filler entanglement structure, so that the switching of the reaction force depending on the speed of input of vibration can be more highly responsive. This makes it possible to provide a vibration damping material having a higher rate of change of stress.

Such features also make it possible to more promptly absorb both of: vibrations caused by a large driving force output from the motor 2 during acceleration; and vibrations caused by irregularities of the road surface and transmitted during the running of the vehicle from wheels 3 to the vehicle body through suspensions 4. Therefore, the vibration damping material has a particularly high level of vibration blocking performance, damping performance, and stiffness as compared to a vibration damping material produced through simple kneading of a silicone oil-boric acid gel and a filler.

The vibration damping material according to this embodiment may have the same number of moles of boric acid as that according to the first embodiment based on 100 moles of the total amount of silicone oil and boric acid, so that it can have stress characteristics variable depending on the speed of input of vibration described above and the occurrence of undissolved residue can be prevented. The number of moles of boric acid is more preferably in the same range as that according to the first embodiment based on 100 moles of the total amount of silicone oil and boric acid, which allows the change of the content to be more significantly effective in improving the variable stress characteristics.

Hereinafter, the filler used to form the vibration damping material according to this embodiment will be described in detail. The filler may be any type that is selected depending on the purpose, such as addition, improvement, or modification of a certain physical property required of the vibration damping material according to this embodiment. Specifically, for electrical conductivity, the filler may be selected from, for example, carbon black, graphite, carbon fibers, metal powder, metal fibers, metal foils, etc. For strength, the filler may be selected from, for example, glass fibers, carbon fibers, potassium titanate, etc. For magnetic properties, the filler may be selected from, for example, fine powders of various magnetic materials, various ferrite-based fine powders, magnetic iron oxide, etc. For thermal conductivity, the filler may be selected from, for example, alumina ($Al_2O_3$), aluminum nitride, boron nitride, beryllium oxide, etc. For damping performance, the filler may be selected from, for example, mica, graphite, carbon fibers, ferrite, etc. For acoustic insulation, the filler may be selected from, for example, iron powder, lead powder, barium sulfate, etc. For lubricity, the filler may be selected from, for example, graphite, hexagonal boron nitride, molybdenum sulfide, Teflon (registered trademark) (PTFE) powder, talc, etc. For heat insulation and lightweight, the filler may be selected from, for example, balloon-shaped materials, such as glass balloons and Shirasu-balloons. For light reflecting or scattering properties, the filler may be selected from, for example, titanium oxide, glass beads, calcium carbonate, aluminum powder, mica, etc. The filler may be made of a flame retardant to have flame retardancy, for example, which may be selected from antimony oxide, fine powder of a hydroxide, such as aluminum hydroxide or magnesium hydroxide, zinc borate, etc. For protection from ultraviolet radiation, the filler may be selected from, for example, titanium oxide, zinc oxide, iron oxide, etc. The filler may be made of a water-absorbing agent to have water absorbability, for example, which may be selected from a water-absorbing polymer gel, calcium oxide, magnesium oxide, etc. For affinity for silicone rubber or silicone oil, the filler may be selected from, for example, silica, fumed silica, etc.

The filler typically has a specific surface area in the range of 20 to 750 $m^2/g$ and preferably in the range of 20 to 50 $m^2/g$. The filler 6 may also be a single material or a mixture of two or more materials.

In this embodiment, the filler preferably has a chemically modified surface. The filler with such a modified surface can be highly reactive for cross-linking reaction (dehydration condensation reaction) between the filler and the silicone oil-boric acid gel, which is preferred. A substituent may be attached to the filler by the surface modification. Examples of such a substituent include functional groups, such as a hydroxy group of chemical formula (24) below, a methyl group of chemical formula (25) below, a phenyl group of chemical formula (26) below, a vinyl group of chemical formula (27) below, a trifluoropropyl group of chemical formula (28) below, an amino group of chemical formula (29) below, a carboxyl group of chemical formula (30) below, a sulfo group of chemical formula (31) below, an aldehyde group of chemical formula (32) below, and a group derived from silicone oil with the skeleton of chemical formula (33) below by removal of a hydrogen atom. The substituent is preferably a hydroxy group.

[Chem. 6]

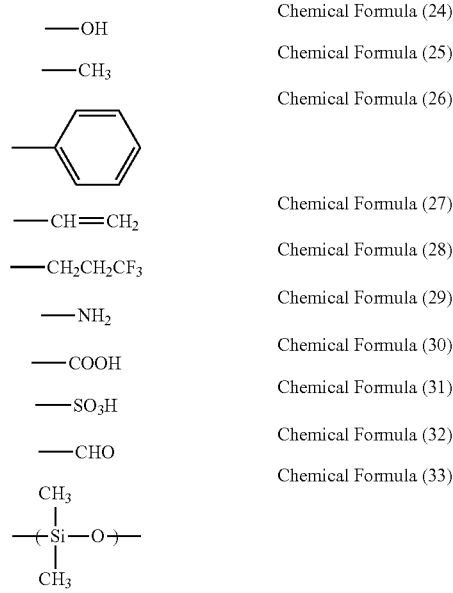

In the process of chemically cross-linking the filler with the silicone oil-boric acid gel to form the vibration damping material according to this embodiment, the amounts of the silicone oil, the boric acid, and the filler are preferably adjusted such that the number of hydroxy groups (—OH groups) on the surface of the filler and the number of hydroxy groups in the silicone oil-boric acid gel are in a ratio close to 1:1. The gel-filler complex with a ratio close to 1:1 between the number of hydroxy groups on the filler and the number of hydroxy groups in the gel can have high hydrophobicity. The number of hydroxy groups (—OH groups) on the surface of the filler can be estimated using a known solid surface analysis method, such as infrared absorption spectroscopy, Fourier transform infrared spectroscopy (FT-IR), diffuse reflection method, or nuclear magnetic resonance method, or using an analytical method including a chemical reaction. When the filler is silica, the density of silanol groups may be estimated using a reaction between the silica filler and lithium aluminum hydride under certain conditions.

The filler used to form the vibration damping material according to this embodiment is preferably a silica material, such as silica or fumed silica, for affinity for the silicone oil-boric acid gel or the silicone rubber described later. The silica filler is a material represented by the formula $(SiO_2)_n$, which has a hydrophobic siloxane bond (—Si—O—Si—) and a hydrophilic silanol group (—Si—OH) on its surface. The silica filler may be produced by one of two processes: a wet process and a dry process. Preferably, the silica filler is produced by the wet process because the resulting product has a large number of silanol groups as described later. The silica surface can be chemically modified by dehydration condensation reaction between silanol groups, and a direct chemical bond is preferably formed by dehydration condensation reaction between the silanol group on the silica surface and the hydroxy group of the silicone oil-boric acid gel.

Figure 11:
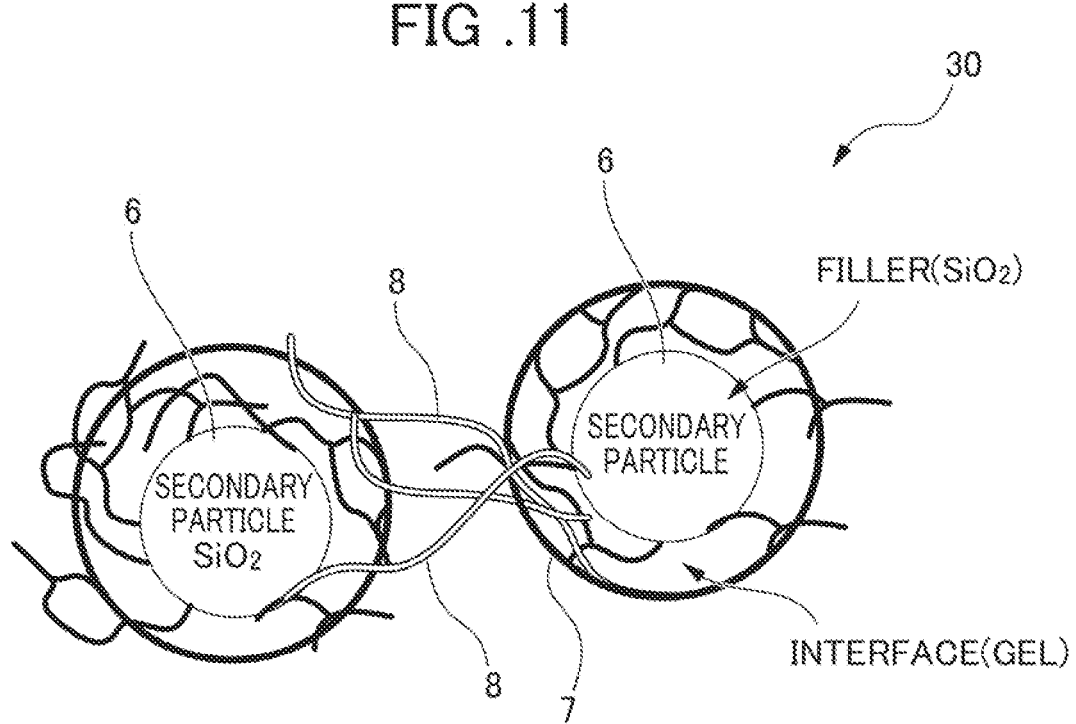
FIG. 11 is a schematic view showing an example of the structure of a vibration damping material according to a second embodiment of the present invention.

In this regard, FIG. 11 is a schematic view showing an example of the structure of the vibration damping material concerning this embodiment. As shown in FIG. 11, the vibration damping material according to this embodiment preferably further includes silicone rubber 8 in addition to the filler 6 and the silicone oil-boric acid gel 7. The vibration damping material according to this embodiment preferably has a structure in which the gel-filler complex described above is chemically bonded to the silicone rubber 8 as a base polymer. According to this feature, a sliding structure and an entanglement structure can also be formed between the silicone rubber polymer chain and the gel-filler complex to make it possible for the variable response vibration damping material to have a further improved level of responsiveness, rate of change of stress, damping performance, vibration blocking performance, and stiffness. In this embodiment, the silicone oil, the silicone rubber, the boric acid, and the base polymer may be the same as those listed for the first embodiment. Hereinafter, the complex including the silicone oil-boric acid gel, the silicone rubber, and the filler is also referred to as the "gel-silicone rubber-filler complex", which is represented by the reference numeral 30.

The amount of the gel-filler complex is preferably 25 to 40% by mass based on 100% by mass of the total amount of the silicone rubber and the gel-filler complex. When the amount of the gel-filler complex is 25% by mass or more based on 100% by mass of the total amount of the silicone rubber and the gel-filler complex, the rubber can provide high stiffness so that high stiffness and high damping performance can be achieved. When the amount of the gel-filler complex is 40% by mass or less based on 100% by mass of the total amount of the silicone rubber and the gel-filler complex, a vibration-blocking effect can be obtained while the reinforcing effect is kept low.

A description will be provided of a method of producing the vibration damping material according to this embodiment having the features described above. First, a gel-filler complex is prepared according to the procedure shown below. A filler is heated with stirring. For example, a silica filler is placed in a glass vessel, which is then covered with a lid. The silica filler is stirred at 120° C. to have a uniform temperature. A gel is then prepared during the heating and stirring of the filler. For example, the gel may be prepared by the method shown below. For example, boric acid and acetone are placed in a glass vessel and stirred at room temperature for 30 minutes. Silicone oil is then added and mixed such that the silicone oil (PDMS) and the boric acid are in a stoichiometric ratio of 3:2. After the elapse of one minute, the mixture is heated to 120° C. with a hot stirrer and then held for 45 minutes so that gel preparation is completed. After the completion of gel preparation, the lid is removed from the glass vessel, the portion of the filler remaining on the lid is removed from the lid into the vessel, and the rotational speed is increased. The gel is then added to the filler. In this step, the gel is added and mixed such that the number of hydroxy groups (—OH groups) of the gel and the number of hydroxy groups (—OH groups) on the filler surface are in a ratio of 1:1 (dehydration condensation step). For example, the gel is preferably added by a falling-drop method using a funnel or by a spray method using a spraying device. When the addition is completed, the mixture is held under conditions at 120° C. for 90 minutes. After the lapse of 90 minutes, the glass vessel is taken out and then held at 50° C. for 12 hours so that a gel-filler complex is obtained.

Subsequently, a vibration damping material including the gel-filler complex prepared as described above and silicone rubber may be prepared in a manner similar to that for the material according to the first embodiment. For example, the gel-filler complex prepared as described above is added to and thoroughly mixed with uncross-linked silicone rubber. Subsequently, the mixture is cast into a mold and then subjected to heating, pressing, and other processes according to the preparation method recommended in the catalog for each corresponding silicone rubber, so that a vibration damping material is obtained.

In the production of the vibration damping material according to this embodiment, the gel-filler complex may be produced not only by what is called a dry process but also by what is called a wet process which includes, for example, using a silica filler slurry instead of the silica filler to form a preparation according to a procedure similar to that for the dry process and then subjecting the preparation to filtration and drying to obtain the gel-filler complex. In the production of the vibration damping material according to this embodiment, the gel-filler complex is preferably produced by the dry process in view of environmental impact and lead time.

It will be understood that the embodiment described above is not intended to limit the present invention and any alterations or modifications of the embodiment will fall within the scope of the present invention as long as they achieve the object of the present invention.

EXAMPLES

Next, examples of the present invention will be described, which are not intended to limit the present invention.

Examples 1 to 11 and Comparative Examples 1 to 3

A gel was prepared according to the procedure shown below. First, acetone and the specified molar amount (mol %) of boric acid were added to a glass vessel and stirred at room temperature for 30 minutes to dissolution. PDMS (silicone oil) was added to the mixture solution obtained after the stirring and then mixed thoroughly. The silicone oil used was WACKER FINISH WS62M manufactured by Wacker Asahikasei Silicone Co., Ltd., which is represented by chemical formula (23) below. In this step, it was visually confirmed that the silicone oil was thoroughly mixed. Subsequently, the mixture was heated and stirred with a hot stirrer at 120° C. for 3 hours. The resulting compound was allowed to stand in a desiccator in which a gel was obtained after the residual acetone and water evaporated.

[Chem. 7]

Chemical Formula (23)

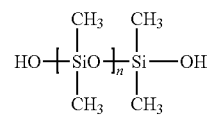

n = about 70

A vibration damping material including the gel and silicone rubber was prepared according to the procedure shown below. First, the gel prepared as described above was added to uncross-linked silicone rubber and kneaded thoroughly. The silicone rubber used was KE5550CU manufactured by Shin-Etsu Chemical Industry Co., Ltd. Subsequently, the mixture was cast into a mold and then subjected to heating, pressing, and other processes according to the preparation method recommended in the catalog for the silicone rubber, so that a vibration damping material was obtained.

Specifically, in the case of millable type (hot vulcanized) silicone rubber, roll mixing (at a rotational speed of 25 rpm and a roll temperature of 40±5° C.) was first performed to carry out mastication (rubber), addition of additives, ¾ turn (reciprocated three times), and passing between rolls (six times). Subsequently, the product was subjected to press forming under conditions at 165° C. for 10 minutes (for forming a sheet) or 15 minutes (for forming a compression set test piece) and then subjected to secondary vulcanization at 200° C. for 4 hours to give a vibration damping material of each example or comparative example.

In the case of silicone rubber that requires mixing of two liquids, the gel was first added to silicone rubber material A and stirred for 1 hour to form a mixture. Subsequently, after the mixture was degassed, silicone rubber material B was added to the mixture. After thorough mixing, the mixture was subjected to cross-linking by heating at 150° C. for at least 2 hours, so that a vibration damping material was obtained.

Formability Evaluation

The formability was evaluated visually. The formability was evaluated as "poor" when dispersion failure was observed visually. The formability was evaluated as "good" when no dispersion failure was observed visually.

The amount (mol %) of boric acid in Examples 1 to 4 and Comparative Examples 1 and 2 was as shown in Table 1. The amount (% by mass) of the gel in Examples 5 to 11 and Comparative Example 3 was as shown in Table 2. Table 1 shows the results of evaluation of the rate (Pa·s) of change of stress and the presence or absence of an undissolved residue regarding Examples 1 to 4 and Comparative Examples 1 and 2. Table 2 shows the results of evaluation of the formability and the rate (%) of change of stress during high-speed input regarding Examples 5 to 11 and Comparative Example 3.

TABLE 1

|  | Comparative Example 1 | Example 1 | Example 2 | Example 3 | Example 4 | Comparative Example 2 |
|---|---|---|---|---|---|---|
| Boric acid content (mol %) | 0 | 25 | 37.5 | 50 | 75 | 87.5 |
| Rate of change of stress (Pa s) | 5.31E−03 | 1.68E−02 | 1.06E−01 | 4.60E+02 | 2.10E+04 | — |
| Undissolved residue (visual observation) | Absent | Absent | Absent | Absent | Absent | Present |

TABLE 2

|  | Comparative Example 3 | Example 5 | Example 6 | Example 7 | Example 8 | Example 9 | Example 10 | Example 11 |
|---|---|---|---|---|---|---|---|---|
| Gel content (% by mass) | 0 | 1 | 5 | 10 | 15 | 20 | 26 | 50 |
| Formability (visual observation) | Good | Good | Good | Good | Good | Good | Good | Poor |
| Change of stress during high-speed input (%) | 1.2 | Not measured | 1.4 | 1.3 | 1.5 | 1.62 | Not measured | Not measured |

Rheometer Test

A rheometer test was performed on the vibration damping materials of Examples 1 to 4 and Comparative Examples 1 and 2, which were prepared as described above. The rheometer test was performed under the following conditions.
 Measurement system: Anton Paar MC320
 Jig: Parallel Plate PP25-SN27128
 Sample height: 1 mm
 Frequency: 0.1 to 100 (rad/s)
 Strain: 1%
 Temperature: 23° C.
Compression Test A compression test was performed on the vibration damping materials of Examples 5 to 11 and Comparative Example 3, which were prepared as described above. The compression test was performed under the following conditions.
 Test piece: φ30 mm, height 12.5 mm
 Test conditions: 6.5 mm compression test
 Input speed: 1, 50, 100, 250, 500 mm/min
Undissolved Residue Evaluation The Presence or Absence of an Undissolved Residue of boric acid was evaluated visually. Any undissolved residue confirmed visually was evaluated as "present", while no undissolved residue confirmed visually was evaluated as "absent".

Figure 9:
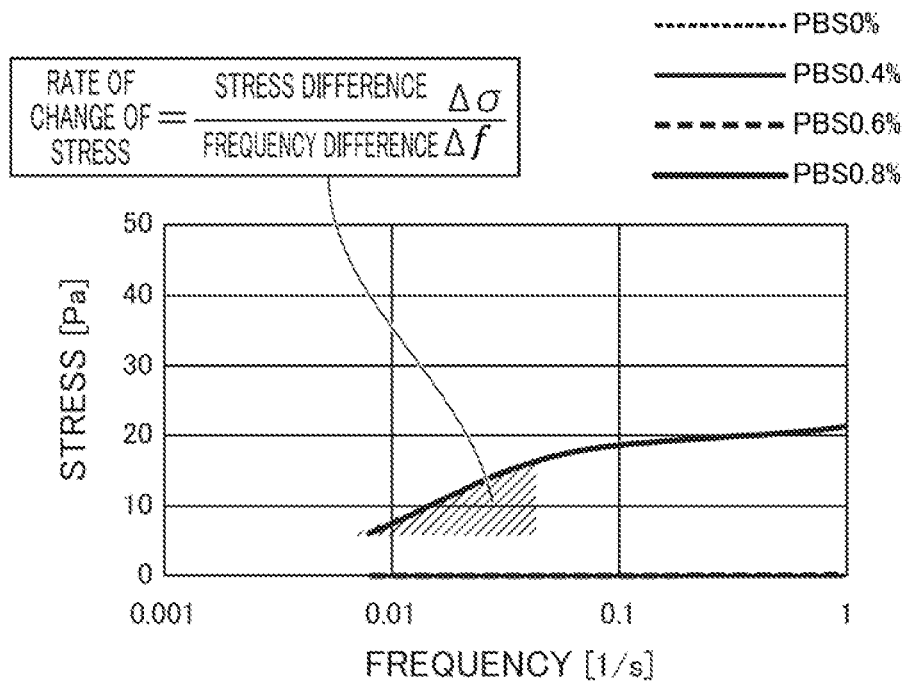
FIG. 9 is a graph showing the rate of change of stress.

The rate of change of stress shown in Table 1 regarding Examples 1 to 4 and Comparative Examples 1 and 2 was calculated from the result of measurement of dynamic viscoelasticity, which was obtained in the rheometer test. It should be noted that, for Comparative Example 2, 2% by volume of boric acid was observed as an undissolved residue, and thus the rheometer test was not performed. In this regard, FIG. 9 is a graph showing the rate of change of stress. As shown in FIG. 9, the rate of change of stress is calculated by dividing the stress difference Ga (the change of stress), which is obtained by the dynamic viscoelasticity measurement, by the frequency difference Gf (the change of frequency). That is, the rate of change of stress is the rate of the change of stress (Pa) relative to the change of frequency (Hz), which corresponds to the slope of the straight-line portion shown in FIG. 9.

Figure 10:
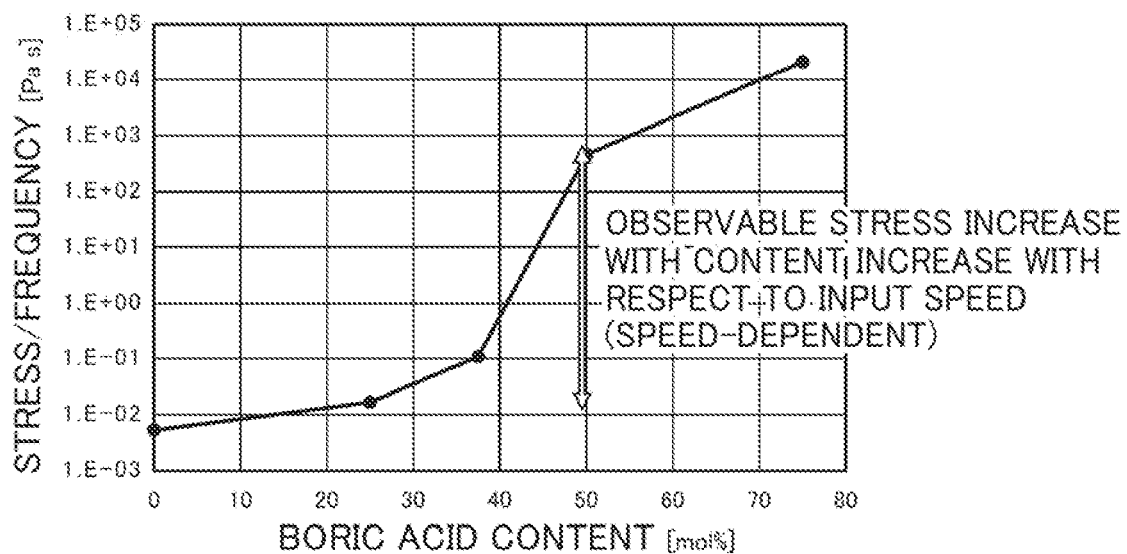
FIG. 10 is a graph showing the relationship between the boric acid content and the rate of change of stress.

FIG. 10 is a graph showing the relationship between the boric acid content and the rate of change of stress. FIG. 10 was plotted using the results on Examples 1 to 4 and Comparative Example 1. FIG. 10 shows that, as the boric acid content increases, the rate of change of stress increases. Accordingly, the stress has been found to increase with increasing boric acid content depending on the speed of input, and has been found to be speed-dependent. It has been demonstrated from the results that the number of moles of boric acid is preferably 25 to 75 based on 100 moles of the total amount of silicone oil and boric acid.

The change of stress during high-speed input shown in Table 2 regarding Examples 5 to 11 and Comparative Example 3 was calculated based on the results of the compression test. Specifically, the result on the relationship between load and displacement was converted to a stress-strain curve, which reflected the shape of the test piece, for the purpose of evaluating the materials in the same shape, and the rate of change of stress was calculated as the rate of change of load. Table 2 shows that, as compared to Comparative Example 3 in which the gel content is 0% by mass, Examples 5 to 10 in which the gel content is at least 1% by mass tend to increase the change of stress during high-speed input. It should be noted that, for Example 11, the measurement was not performed in the compression test because the formability was poor due to unsuccessful dispersion. It has been demonstrated from the results that the gel content is preferably 1 to 30% by mass based on 100% by mass of the total amount of the silicone rubber and the gel.

Examples 12 to 16 and Comparative Examples 4 to 5

A gel-filler complex was prepared according to the procedure shown below. First, a filler was heated with stirring. After 30 parts by weight of the filler was placed in a glass vessel, which was then covered with a lid, the filler was stirred at 120° C. to have a uniform temperature. The filler used was AEROSIL 50 manufactured by Nippon Aerosil Co., Ltd. Next, a gel was prepared during the heating and stirring of the filler. Acetone and the specified molar amount (mol %) of boric acid were added to a glass vessel and stirred at room temperature and a rotational speed of 400 rpm for 30 minutes to dissolution. PDMS (silicone oil) was added to the mixture solution obtained after the stirring and then thoroughly mixed by stirring at a rotational speed of 400 rpm. The silicone oil used was WACKER FINISH WS62M manufactured by Wacker Asahikasei Silicone Co., Ltd., which is represented by chemical formula (23) below. In this step, it was visually confirmed that the silicone oil was thoroughly mixed. Subsequently, the mixture was heated and stirred with a hot stirrer at 120° C. and a rotational speed of 400 rpm for 3 hours. The resulting compound was allowed to stand for 45 minutes in a desiccator in which a gel was obtained after the residual acetone and water evaporated. After the preparation of the gel was completed, the lid was removed from the glass vessel, the portion of the filler remaining on the lid was removed from the lid into the vessel, and the rotational speed was increased to 735 rpm. Subsequently, the gel was added dropwise to the filler. After the completion of the dropwise addition, the mixture was held under conditions at 120° C. and a rotational speed of 735 rpm for 90 minutes. After the elapse of 90 minutes, the glass vessel was taken out and then held in a thermostatic chamber at 50° C. for 12 hours, so that a gel-filler complex was obtained.

[Chem. 8]

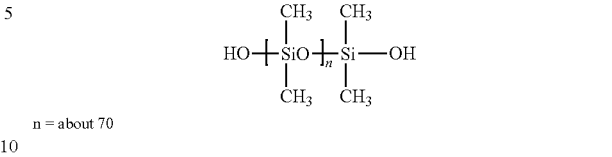

Chemical Formula (23)

n = about 70

A vibration damping material of Example 12 including the gel-filler complex and silicone rubber was prepared according to the procedure shown below. First, the gel-filler complex prepared as described above was added to uncross-linked silicone rubber and kneaded thoroughly. The silicone rubber used was KE5550U manufactured by Shin-Etsu Chemical Industry Co., Ltd. Subsequently, the mixture was cast into a mold and then subjected to heating, pressing, and other processes according to the preparation method recommended in the catalog for the silicone rubber, so that a vibration damping material was obtained.

Specifically, in the case of millable type (hot vulcanized) silicone rubber, roll mixing (at a rotational speed of 25 rpm and a roll temperature of 40±5° C.) was first performed to carry out mastication (rubber), addition of additives, ¾ turn (reciprocated three times), and passing between rolls (six times). Subsequently, the product was subjected to press forming under conditions at 165° C. for 10 minutes (for forming a sheet) or 15 minutes (for forming a compression set test piece) and then subjected to secondary vulcanization at 200° C. for 4 hours to give a vibration damping material of each example or comparative example.

In the case of silicone rubber that requires mixing of two liquids, the gel-filler complex was first added to silicone rubber material A and stirred for 1 hour to form a mixture. Subsequently, after the mixture was degassed, silicone rubber material B was added to the mixture. After thorough mixing, the mixture was subjected to cross-linking by heating at 150° C. for at least 2 hours, so that a vibration damping material was obtained.

Compression Test

A compression test was performed on the vibration damping materials of Examples 12 to 16 and Comparative Examples 4 and 5, which were prepared as described above. The compression test was performed under the conditions shown above.

In Example 13, no filler was added, and 5 parts by mass of the silicone oil-boric acid gel was added to the silicone rubber KE5550U (manufactured by Shin-Etsu Chemical Industry Co., Ltd.) and kneaded under the conditions shown above. The resulting mixture was then molded to form a vibration damping material. In Example 14, a vibration damping material was prepared under the same conditions as in Example 13, except that the silicone oil-boric acid gel was added in an amount of 10 parts by mass. In Example 15, 30 parts by mass of a silica filler TB (manufactured by Tosoh Silica Corporation) and 5 parts by mass of the gel were separately added to the silicone rubber KE5550U and kneaded under the conditions shown above. The resulting mixture was then molded to form a vibration damping material. In Example 16, a vibration damping material was prepared under the same conditions as in Example 15, except that the gel was added in an amount of 10 parts by mass.

In Comparative Example 4, 30 parts by mass of a silica filler TB (manufactured by Tosoh Silica Corporation) was added to the silicone rubber KE5550U, and then kneaded under the conditions shown above. The resulting mixture was molded to form a vibration damping material. In Comparative Example 5, the silicone rubber KE5550U was kneaded under the conditions shown above with neither addition of the filler nor addition of the gel, and then molded to form a vibration damping material.

Figure 12:
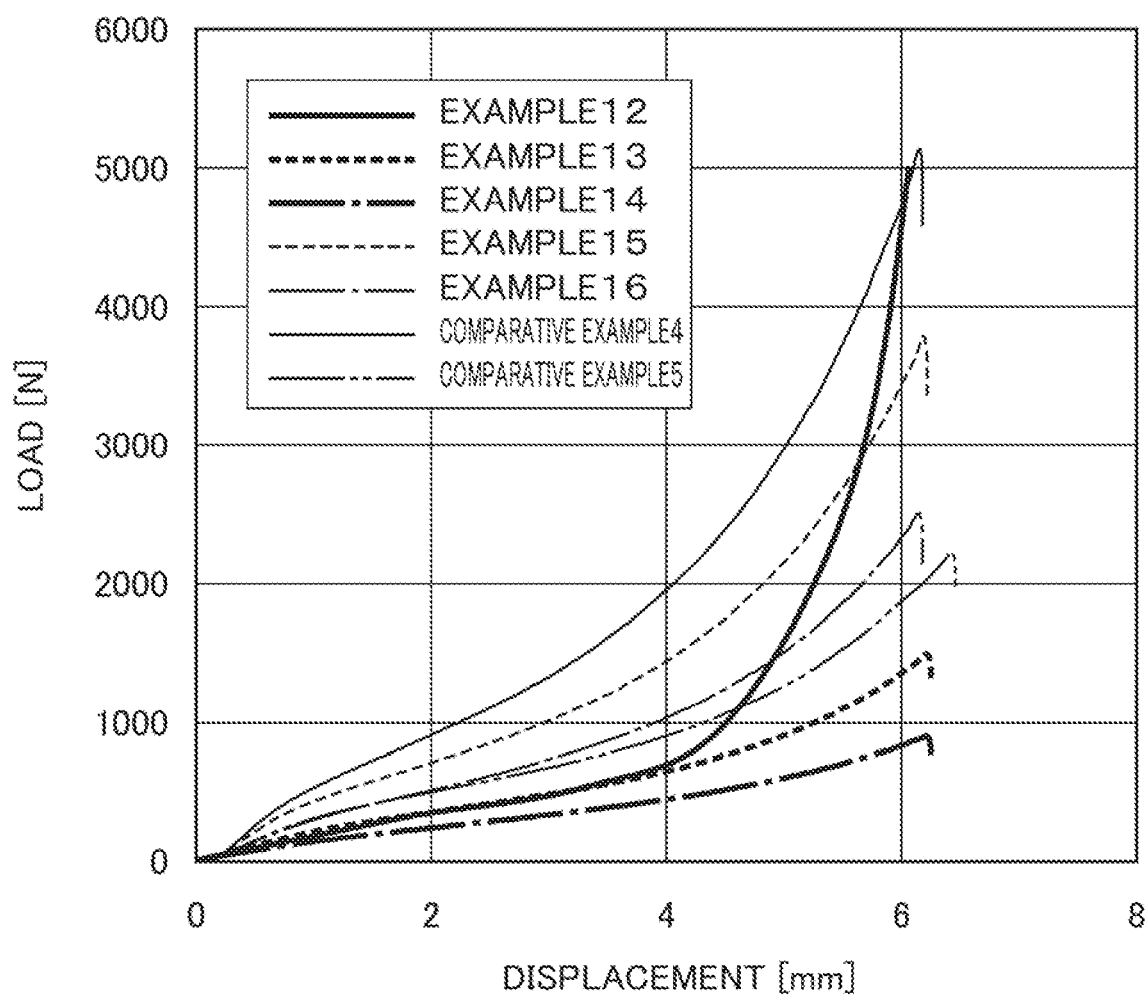
FIG. 12 is a graph showing the relationship between loads on vibration damping materials and corresponding displacements of the vibration damping materials.

As an example of the evaluation of damping performance, FIG. 12 shows a graph in which load-displacement curves are plotted with respect to Examples 12 to 16 and Comparative Examples 4 and 5. It should be noted that the load/displacement value corresponds to the spring constant when the load and the displacement show a proportional relationship in the load-displacement curve. FIG. 12 shows that the load-displacement curve of the vibration damping material of Example 12 drastically changes in slope at a displacement of about 4.25 mm and an input load of about 800 N. Specifically, the small Δ load/Δ displacement value at a displacement of about 4.25 mm or less indicates a particularly high level of vibration blocking performance and damping performance and low stiffness for low-load input. Moreover, the vibration damping material of Example 12 has a large Δ load/Δ displacement value at a displacement of more than about 4.25 mm and an input load of more than 800 N, which indicates that it can have high stiffness against high-load input and can produce a reaction force against external shock. Therefore, the vibration damping material of Example 12, which drastically changes in stiffness against load input at a displacement of about 4.25 mm and an input load of about 800 N, has high performance as a variable response vibration damping material capable of absorbing both of: driving force-derived vibrations; and road surface irregularities-derived vibrations.

FIG. 12 shows that the load-displacement curve of the vibration damping material of Example 13 has an inflection point at a displacement of about 4.5 mm and an input load of about 300 N. The small Δ load/Δ displacement value from the origin to the inflection point indicates a high level of vibration blocking performance and damping performance. FIG. 12 also shows that the load-displacement curve of the vibration damping material of Example 14 has an inflection point at a displacement of about 4.5 mm and an input load of about 600 N, in which the small Δ load/Δ displacement value from the origin to the inflection point indicates a higher level of vibration blocking performance and damping performance.

FIG. 12 shows that the load-displacement curve of the vibration damping material of Example 15 has an inflection point at a displacement of about 4.5 mm and an input load of about 1,700 N. The large Δ load/Δ displacement value from the inflection point to the fracture point indicates that the material of Example 15 can have high stiffness and produce a reaction force against external shock. FIG. 12 also shows that the load-displacement curve of the vibration damping material of Example 16 has an inflection point at a displacement of about 4.5 mm and an input load of about 1,200 N. The small Δ load/Δ displacement value from the origin to the inflection point indicates the material of Example 16 can have vibration blocking performance and damping performance, and the large Δ load/Δ displacement value from the inflection point to the fracture point indicates that the material of Example 16 can be stiff and produce a reaction force against external shock.

FIG. 12 shows that the load-displacement curve of the vibration damping material of Comparative Example 4 has an inflection point at a displacement of about 4.5 mm and an input load of about 2,300 N. The Δ load/Δ displacement value from the origin to near the inflection point and the Δ load/Δ displacement value from near the inflection point to the fracture point indicate that the material of Comparative Example 4 has vibration blocking performance, damping performance, and stiffness all lower than those of the vibration damping material of each example. FIG. 12 shows that the load-displacement curve of the vibration damping material of Comparative Example 5 has an inflection point at a displacement of about 5.0 mm and an input load of about 1,200 N. The Δ load/Δ displacement value from the origin to near the inflection point and the Δ load/Δ displacement value from near the inflection point to the fracture point indicate that the material of Comparative Example 5 has vibration blocking performance, damping performance, and stiffness all lower than those of the vibration damping material of each example.

It has been demonstrated from the results shown above that the vibration damping materials according to the first and second embodiments have a higher rate of change of stress than that in the conventional art and can deal with not only large stress associated with a change in torque at the start of rotation of the rotary shaft of a motor but also small vibrations during running. It has also been demonstrated that the vibration damping material according to the second embodiment, which contains a filler and has a chemical bond between the filler, silicone rubber, and a gel as a dehydration condensation product of silicone oil and boric acid, has a particularly high level of vibration blocking performance and damping performance. The present invention also makes it possible to provide a method of producing a vibration damping material with improved damping performance.

EXPLANATION OF REFERENCE NUMERALS

1: Motor support structure
2: Motor
3: Wheel
4: Suspension
5: Vibration damping material
6: Filler
7: Silicone oil-boric acid gel
8: Silicone rubber
10: Frame
11: Rear mount part
12: Right front mount part
13: Left front mount part
30: Gel-silicone rubber-filler complex

What is claimed is:

1. A vibration damping material for use in a mount part for supporting a motor,
   the vibration damping material comprising: a gel of a dehydration condensation reaction product of silicone oil and boric acid,
   wherein the boric acid is in an amount of 25 to 75 moles based on 100 moles of a total amount of the silicone oil and the boric acid.

2. The vibration damping material according to claim 1, wherein
   the silicone oil has at least one side chain selected from the group consisting of a methyl group, a phenyl group, and a vinyl group, and
   the silicon oil has at least one end group selected from the group consisting of a hydroxy group, a carboxyl group, a sulfo group, a group derived from an alcohol by removal of a non-hydroxylic hydrogen atom, and a group derived from a diol by removal of a non-hydroxylic hydrogen atom.

3. The vibration damping material according to claim 1, wherein
the silicone oil has a methyl group as a side chain, and
the silicone oil has a hydroxy group at each end.

4. The vibration damping material according to claim 1, further comprising silicone rubber,
wherein the gel is in an amount of 1 to 30% by mass based on 100% by mass of a total amount of the silicone rubber and the gel.

5. The vibration damping material according to claim 4, wherein
the silicone rubber has at least one side chain selected from the group consisting of a methyl group, a phenyl group, a vinyl group, a fluoro group, a trifluoromethyl group, and a trifluoropropyl group, and
the silicone rubber has at least one end group selected from the group consisting of a methyl group, a hydroxy group, and a vinyl group.

6. The vibration damping material according to claim 1, further comprising a filler and
having a chemical bond between the filler and the gel.

7. A method of producing the vibration damping material according to claim 6,
the method comprising:
providing the filler having a substituent; and
performing a dehydration condensation step including subjecting the gel and the substituent of the filler to a dehydration condensation reaction to form a chemical bond between the filler and the gel.

* * * * *